July 23, 1957  P. ARANT  2,800,117
FEED WATER CONTROL MEANS FOR STEAM GENERATING SYSTEMS
Filed April 17, 1951  6 Sheets-Sheet 6

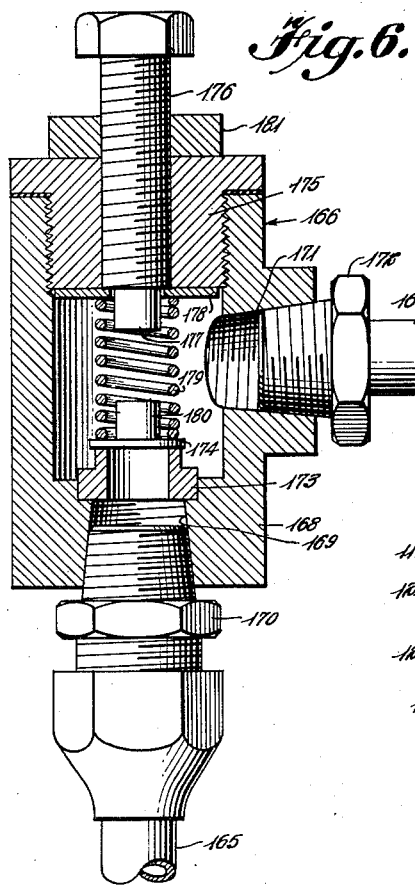
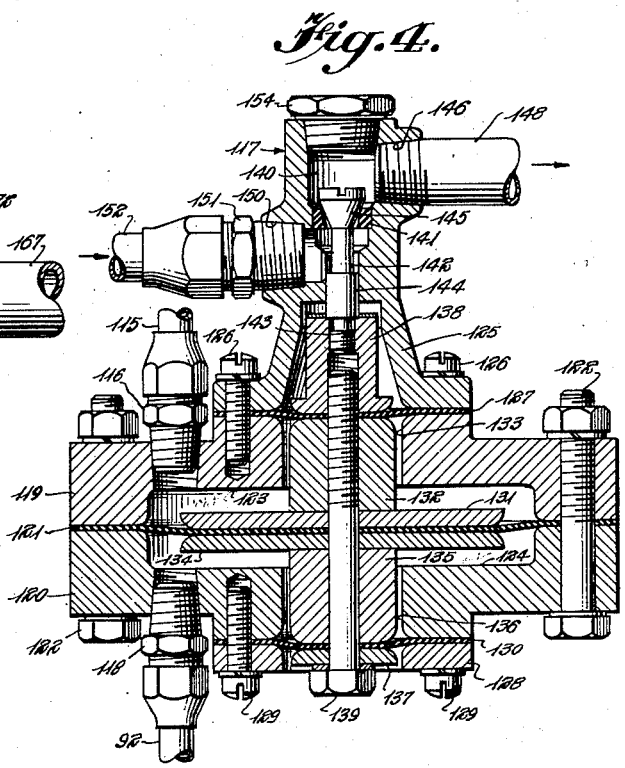
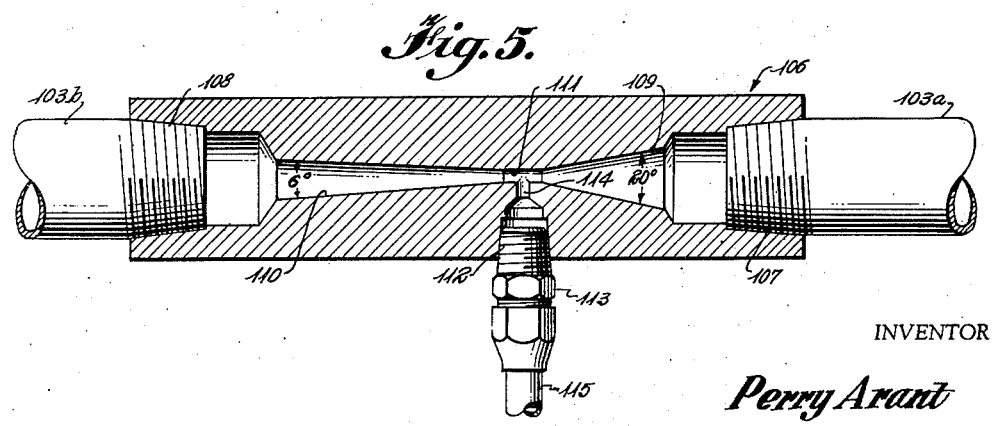
INVENTOR
*Perry Arant*
BY *Bacon & Thomas*
ATTORNEYS

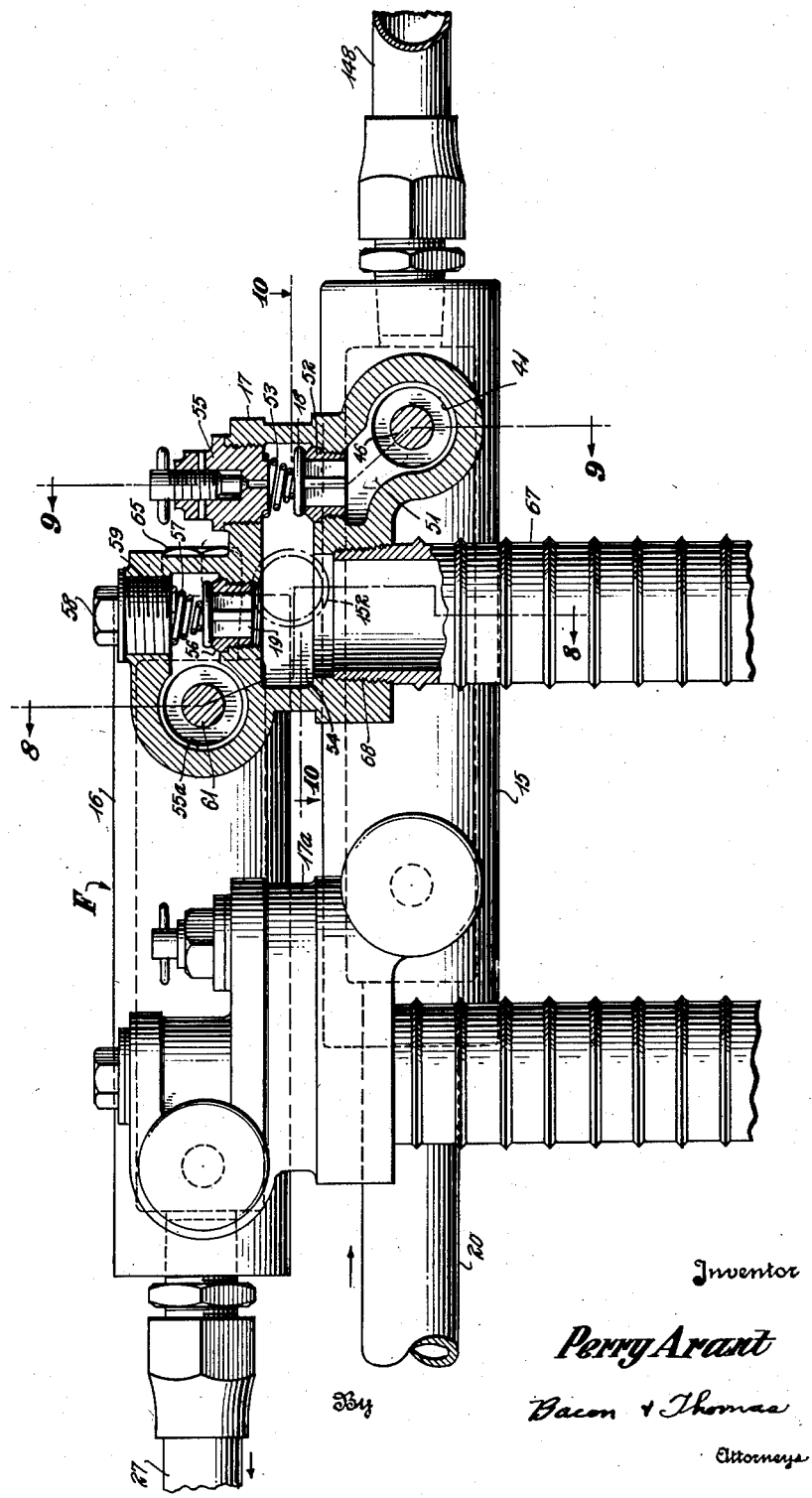

Inventor
Perry Arant
By Bacon + Thomas
Attorneys

United States Patent Office 2,800,117
Patented July 23, 1957

2,800,117

FEED WATER CONTROL MEANS FOR STEAM GENERATING SYSTEMS

Perry Arant, San Gabriel, Calif., assignor to Clayton Manufacturing Company, El Monte, Calif., a corporation of California Application April 17, 1951, Serial No. 221,418

13 Claims. (Cl. 122—451.2)

The present invention relates to steam generating apparatus, and more particularly to novel systems of feed water supply control, recirculation and refeeding for use with steam generating units including a heating coil and steam separator, whereby a maximum of efficiency in operation can be attained.

The principal object of the invention is to provide feed water control means for automatic steam generating systems particularly adapted to operate under variable or modulated steam load requirements and which will maintain a fairly constant volume of water in the system notwithstanding substantial variations in the load or steam demand.

Another object of the invention is to provide automatic means for reducing the amount of feed water added to a steam generating system in accordance with the amount of excess water then present in the system.

Another object of the invention is to provide a steam generating system having automatic, pressure differential operated control means which will effect by-passing of feed water at the feed water pump so long as there is an excess of water above a predetermined water level in the steam separator.

Another object of the invention is to provide feed water control means for a steam generating system which is responsive to the pressure differential across two selected points of the system.

A more specific object of the invention is to provide feed water control means for a steam generating system which is responsive to the pressure differential between the steam pressure in the steam separator and the hydrokinetic pressure of the excess liquid discharged from the steam separator.

Another specific object of the invention is to provide feed water control means for a steam generating system which is responsive to the pressure differential between the pressure of the feed water being introduced into the heating coil and the discharge pressure of a pump "re-feeding" excess water back to the heating coil from the steam separator.

A still further object of the invention is to provide an automatic feed water control means for steam generating apparatus which will reduce the volume of feed water normally added to the system whenever the liquid level in the steam separator rises above a predetermined height.

A still further object of the invention is to provide a steam generating system wherein water in the steam separator in excess of a predetermined volume is "re-fed" back to the heating coil in lieu of pumping an equivalent amount of feed water into the system from a feed water tank or hot well.

Still another object of the invention is to provide a steam generating system wherein the trapping out of water from the steam separator for return to the feed water tank is substantially eliminated, thereby avoiding pump vapor-lock and heat loss through vapor escaping from the feed water tank.

Other objects and advantages of the invention will be apparent from the following description taken in conjunction with the accompanying drawings, in which:

Fig. 1 diagrammatically illustrates a steam generating apparatus and feed water control system in which the by-passing of feed water at the feed water pump is automatically controlled in accordance with the pressure differential between the pressure of the steam in the steam separator and the hydrokinetic pressure of excess water from the steam separator at a Venturi nozzle in the re-feed line;

Fig. 2 diagrammatically illustrates a modified form of the invention in which the by-passing of feed water is controlled in part by a back pressure valve having its inlet connected with the discharge side of the re-feed pump so that feed water is supplied in accordance with the pressure differential between the pressure in the feed water line from the feed water pump connected to the heating coil inlet and the pressure on the discharge side of the re-feed pump;

Fig. 3 diagrammatically illustrates another form of the invention wherein a solenoid valve associated with the feed water pump is operated to automatically effect by-passing of feed water whenever the liquid level in the steam separator rises above a predetermined height;

Fig. 4 is an enlarged vertical sectional view through the pressure differential operated by-pass control valve embodied in the steam generating system shown in Figs. 1 and 2;

Fig. 5 is an enlarged longitudinal sectional view through the Venturi member connected in the re-feed line of the system shown in Fig. 1;

Fig. 6 is an enlarged vertical sectional view through the back pressure control valve employed in the system illustrated in Fig. 2;

Fig. 7 is a view partly in section taken on the line 7—7 of Fig. 1 and particularly illustrating the check valve arrangement for one pumping head of the feed water pump;

Figure 1:
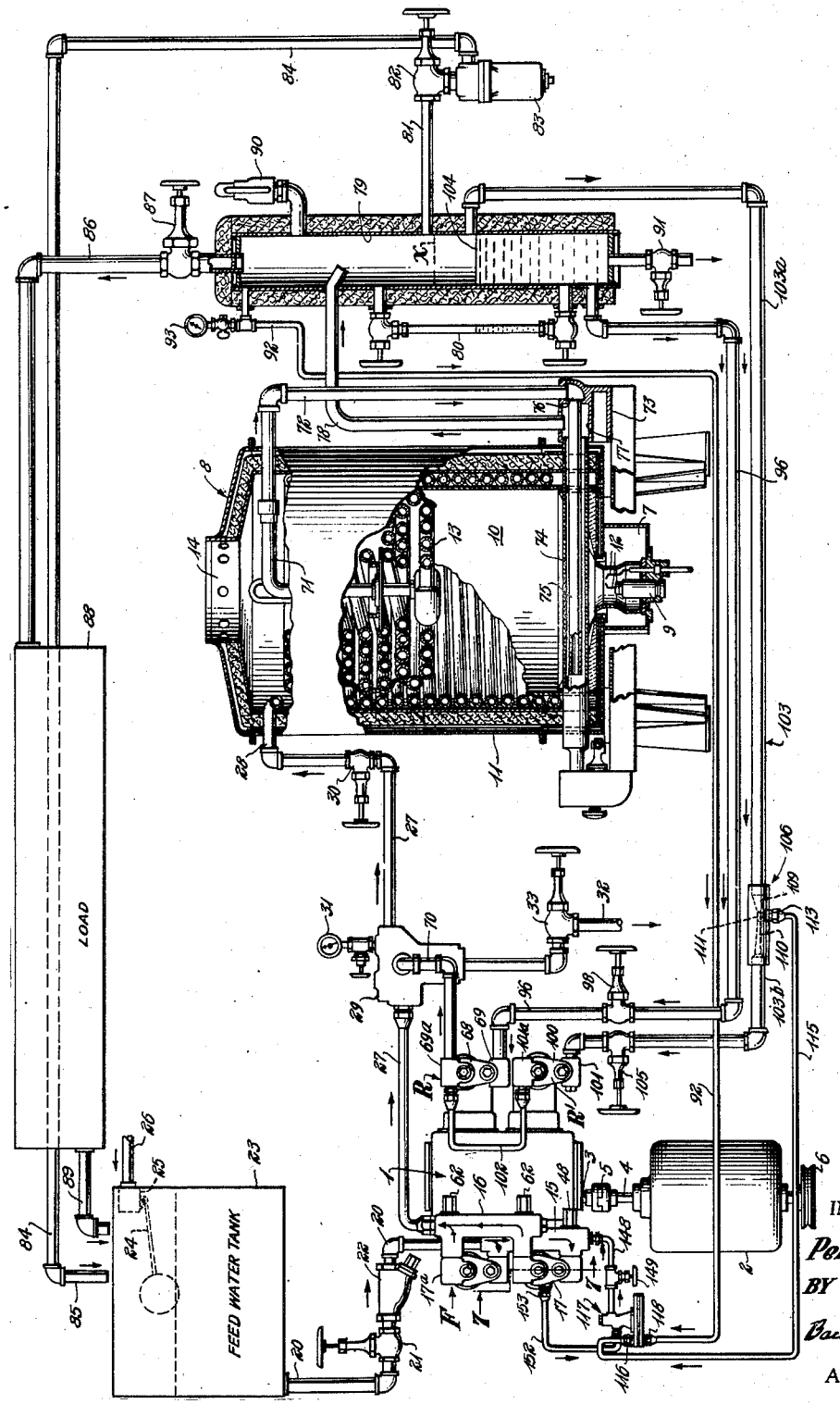

Referring now to Fig. 1 of the drawings, the numeral 1 generally indicates a conventional multiple head pump means comprising a doubled headed feed water supply pump F, a single headed recirculating pump R, and a single headed re-feed pump R', all operating simultaneously. The pump means 1 has a shaft 3 driven by an electric motor 2 having a shaft 4 connected with said pump means by a conventional coupling 5. The motor shaft 4 carries a pulley 6 adapted to drive a blower (not shown) for supplying air to an air inlet chamber 7 of a steam generating unit generally designated by the numeral 8. The steam generating unit 8 includes a suitable gas burner 9 to which gas is supplied by any conventional means (not shown). The fuel is burned in a combustion chamber 10 disposed within a housing 11 and is ignited by conventional spark forming electrodes 12. The housing 11 contains a liquid heater in the form of a heating coil 13 through which the liquid to be heated is pumped. A flue 14 is provided at the upper end of the housing 11 for the escape of the products of combustion.

The feed pump F includes an intake feed manifold 15 and an outlet feed manifold 16 interconnected by identical housings 17 and 17a each forming a separate pump head and containing an inlet check valve 18 and an outlet check valve 19 (see Fig. 7), and which housings will be described in greater detail hereinafter. The intake feed manifold 15 is connected by a pipe line 20, Fig. 1, containing a shut-off valve 21 and a strainer 22, with a feed water tank 23 containing water at a temperature normally low enough so that no steam vapors arise therefrom. A predetermined minimum water level is maintained in the feed water tank 23 by a float mechanism 24 operatively associated with a conventional float-controlled valve 25 and a water supply pipe 26.

The discharge manifold 16 of the feed pump F is connected by a conduit 27 with the inlet end 28 of the heating coil 13. A mixing chamber 29 and a valve 30 are connected in the conduit 27, with the valve 30 located between the mixing chamber 29 and the inlet end 28 of the heating coil 13. A conventional pressure gauge 31 is connected with the mixing chamber 29 to indicate the feed water pressure. A pipe 32 having a valve 33 disposed therein is connected with the mixing chamber 29 and extends downwardly therefrom and serves as a blow-down connection for the heating coil 13.

Figure 9:
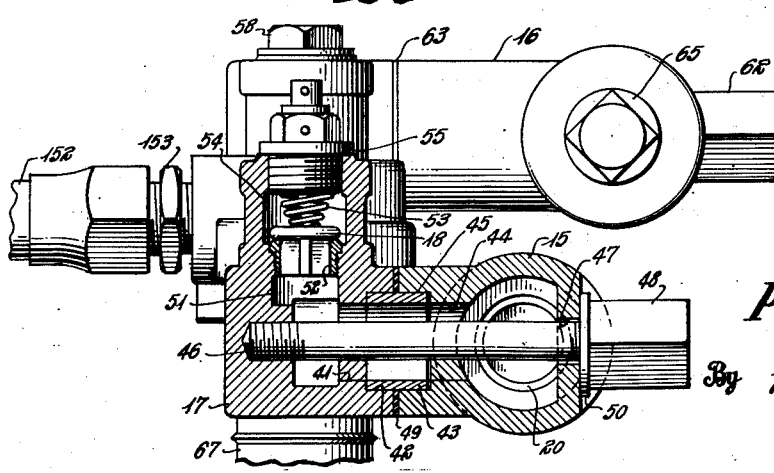
Fig. 9 is a vertical sectional view taken on the line 9—9 of Fig. 7.

Referring now to Figs. 7 and 9, the pumping head housings 17 and 17a are substantially identical in construction and a description of one will therefore suffice for both. The housing 17 has an inlet opening 41 (Fig. 9) which is counterbored as indicated at 42 to receive a bushing 43. The intake feed manifold 15 has an outlet opening 44 which is counterbored at 45 to receive the bushing 43. The bushing 43 thus serves to align the housing 17 with the intake manifold 15. A stud 46 is threaded into the housing 17 and projects through an opening 47 in the manifold 15. A cap nut 48 is mounted upon the outer end of the stud 46 and secures the housing 17 and manifold 15 together in assembled relation. Suitable sealing means 49 is interposed between the confronting faces of the housing 17 and manifold 15 to avoid leakage, and a suitable gasket 50 is disposed between the cap nut 48 and the manifold 15.

The opening 41 in the housing 17 communicates with a passageway 51 (Fig. 7) controlled by the inlet check valve 18 previously referred to. The check valve 18 is normally urged toward its seat 52 by a conical spring 53. The housing 17 is further provided with a chamber 54 and the check valve 18 controls the flow of liquid from the passage 51 into the chamber 54. A bleeder valve 55 is mounted in the housing 17 directly above the check valve 18 and provides a means for venting air from the chamber 54 when the pump means 1 is first started.

Figure 8:
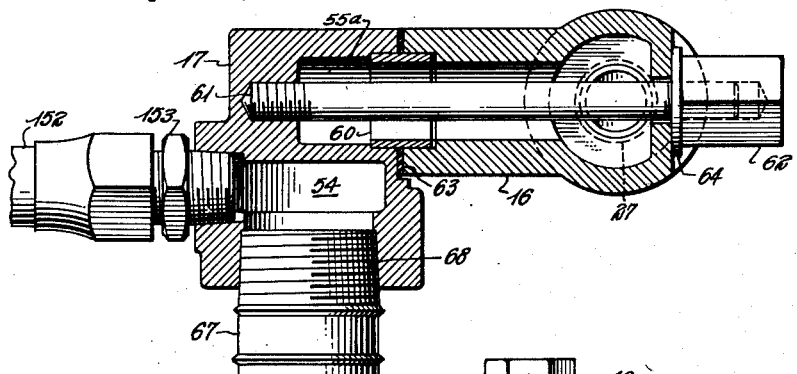
Fig. 8 is a vertical sectional view taken on the line 8—8 of Fig. 7.
Figure 10:
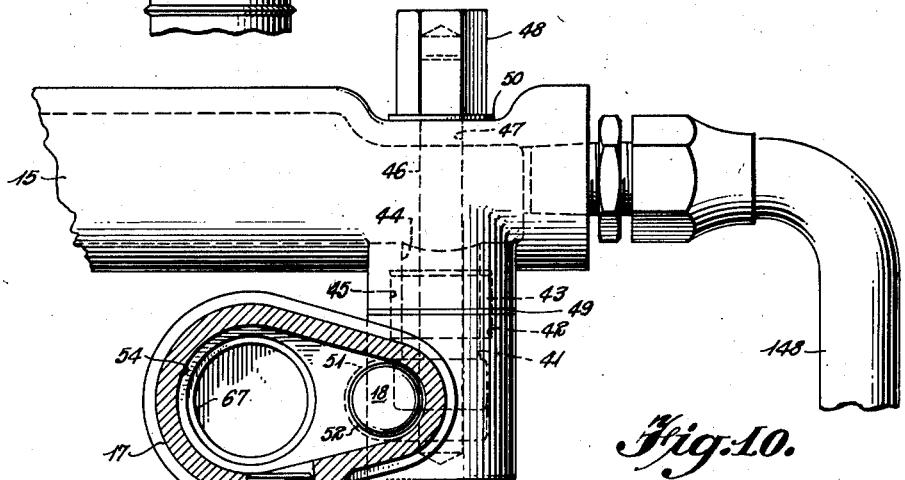
Fig. 10 is a horizontal sectional view taken on the line 10—10 of Fig. 7.

The housing 17 is still further provided with an opening 55a (Fig. 7) adapted to communicate with the chamber 54 when the outlet check valve 19 is raised from its seat 56. A spring 57 normally tends to maintain the check valve 19 closed. A removable plug 58 is disposed in an opening 59 directly above the check valve 19. As will be apparent from Fig. 8, the opening 55a communicates with the outlet feed manifold 16 and said manifold is aligned with the housing 17 by a bushing 60 similar to the bushing 43. A stud 61 is threaded into the housing 17 and a cap nut 62 on the outer end of the stud secures the manifold 16 to the housing 17. Suitable sealing means 63 is disposed between the confronting faces of the housing 17 and the manifold 16 and a suitable gasket 64 is disposed between the manifold 16 and the cap nut 62. One end of the outlet feed manifold 16 is closed by a plug 65 and its opposite end is connected to the pipe 27.

A standpipe 67 (Fig. 7) is threaded into an opening 68 in the housing 17 and communicates at its upper end directly with the chamber 54. Normally, the standpipe 67 is filled with water and provides a water column through which pulsations from the pump means 1 are transmitted to any liquid contained in the chamber 54. The pump means 1 may include any suitable elements, such as a diaphragm (not shown) for producing pulsations in the standpipe 67 to produce a pumping action.

It will be apparent from the description thus far, that the water introduced into the intake feed manifold 15 through the pipe 20 will enter the opening 41 in the housing 17 and flow into the passageway 51, the inlet check valve 18 opening in response to the pressure of such liquid to admit the same into the chamber 54, between pulsations in the standpipe 67, and fill said chamber. Hence, upon the next pulsation imparted to the liquid column in the standpipe 67, a certain amount of water will be displaced from the chamber 54 and forced past the outlet check valve 19 into the opening 55a from whence it will flow into the outlet feed manifold 16 and into the pipe 27 for delivery to the heating coil 13.

The recirculating pump unit R of the pump means 1 includes a head or housing 68, Fig. 1, which is similar to the feed pump heads 17 and 17a and includes an intake end 69 and an outlet end 69a. A pipe 70 connects the outlet end 69a of the housing 68 with the mixing chamber 29. It will be understood that the housing 68 contains check valves similar to the check valves 18 and 19 already described. It will also be understood that the housing 68 has a standpipe (not shown) which functions like the standpipes 67 to provide a pumping action to effect recirculation of excess liquid from the steam separator, as will be described more fully hereinafter.

The heating coil 13 has an outlet end 71 which is connected by a pipe 72 to a housing 73, which forms part of an automatic thermostat control device for controlling the supply of fuel to the burner 9, the details of construction and mode of operation of the thermostat not being disclosed herein for the reason that they are unimportant to the invention claimed. However, the thermostat control is amply disclosed in the patent to Kerrick 2,154,683, and for explanatory purposes it is merely pointed out here that a pipe 74 is connected with one end of the housing 73 and has a tube 75 arranged concentrically therein, one end of said tube being mounted as indicated at 76 in the housing 73 and its other end arranged so as to discharge the heated fluid from the heating coil 13 into the pipe 74. The fluid thus discharged into the pipe 74 flows back into a chamber 77 in the housing 73 and one end of a conduit 78 communicates with the chamber 77 and its other end discharges into the steam space of a steam separator or steam accumulator 79. Any of the liquid discharged into the steam separator 79 and not flashed into vapor collects in the bottom thereof, the level of the liquid being indicated by a conventional gauge glass 80. In order to prevent the liquid level in the steam separator 79 from rising above a predetermined height, one end of a pipe 81 is connected to said separator at a level $x$ corresponding to the maximum permissible liquid level in the separator, and the other end of said pipe is connected with the inlet of a manually operable angle valve 82. The outlet of the valve 82 is connected to a conventional steam trap 83. The outlet of the steam trap 83 has one end of a return pipe 84 connected thereto for returning any liquid trapped out from the steam separator 79 to the feed water tank 23, the pipe 84 having a discharge nipple 85 located above the tank 23, as shown. The steam trap 83 is provided primarily as a precautionary measure inasmuch as the normal use of the apparatus contemplates no trapping back of liquid from the steam separator 79 to the tank 23.

Steam may be withdrawn from the upper end of the steam separator 79 through a pipeline 86 having a manually operable shutoff valve 87 connected therein. The pipeline 86 is connected with a load diagrammatically indicated at 88. A condensate return pipe 89 returns condensate from the load 88 to the feed water tank 23. The steam separator 79 is also provided with a safety or relief valve 90 and a blow-off or drain valve 91. A conduit 92 is connected with the upper portion of the steam separator 79 for a purpose which will be described later, and a pressure gauge 93 is conveniently connected in the conduit 92 to indicate the steam pressure in said steam separator.

A recirculation pipe 96 has one end thereof connected with the steam separator 79 at a point adjacent the lower end of said steam separator and its opposite end is connected with the intake 69 of the recirculating pump unit R. As has already been stated, the pipe 70 has one end thereof connected with the pump outlet or discharge 69a and its other end connected with the mixing chamber 29. Thus, it will be apparent that feed water delivered by the feed pump unit F through the conduit 27 to the mixing chamber 29 is mixed with the recirculating liquid delivered by the recirculating pump unit R, so that the feed water and recirculating liquid are intermixed before entering the inlet end 28 of the heating coil 13. The recirculating pipe 96 has a manually operable shutoff valve 98 connected therein for interrupting communication between the steam separator and the recirculating pump R, when such interruption is desired.

The re-feed pump unit R' of the pump means 1 includes a pump head or housing 100 having an intake end 101 and a discharge end 101a similar to the pump head 68 of the recirculating pump unit R. The discharge end 101a is connected with the discharge end 69a of the recirculating pump R by a tube 102, so that the pump units R' and R have their discharge outlets connected in series. A re-feed pipe 103 has one end thereof in communication with the steam separator 79 at a preferred normal liquid level indicated at 104, and its opposite end connected with the intake 101 of the re-feed pump R', so that should the liquid in the steam separator 79 rise above the level 104, the excess liquid will overflow into the re-feed pipe 103 for re-feed back into the system through the re-feed pump unit R'. A manually operable shutoff valve 105 is connected in the re-feed line 103 at a point adjacent the intake 100. A Venturi member 106 is connected in the re-feed pipe 103 at a point between the valve 105 and the steam separator 79. The Venturi member 106 is shown in detail in cross-section in Fig. 5, to which reference will now be made. The Venturi member 106 has a threaded bore 107 at one end thereof for the reception of one section 103a of the re-feed pipe 103 which receives the excess water from the steam separator 79. The opposite end of the Venturi member 106 is provided with a similar threaded bore 108 which receives one end of another section 103b of the re-feed pipe 103 and which is subject to the suction of the intake of the re-feed pump R'. The threaded bore 107 merges into a nozzle portion 109 having the walls thereof converging in the direction of flow at an included angle of about 20 degrees, and the bore 108 merges into a nozzle portion 110 which is twice as long as the nozzle portion 109 and has the walls thereof diverging in the direction of flow at an angle of about 6 degrees. A cylindrical bore 111 of a diameter of about .09" interconnects the nozzle portions 109 and 110 and forms the throat of the Venturi member 106. A threaded bore 112 is provided in the side of the Venture member 106 at a region coinciding with the throat 111 and a conventional fitting 113 is mounted in said bore. A passage 114 establishes communication between the bore 112 and the throat 111. One end of a conduit 115 is connected to the fitting 113 and its opposite end is connected by a conventional fitting 116 to one side of the diaphragm chamber of a pressure differential operated by-pass valve 117. The conduit 92 having the pressure gauge 93 connected therein, previously referred to, has one end thereof connected with the other side of the diaphragm chamber of the valve 117 by a conventional fitting 118. The valve 117 is shown in cross-section in Fig. 4, to which reference will now be made.

The fittings 116 and 118 are respectively mounted in valve sections 119 and 120 having a flexible diaphragm 121 disposed therebetween and secured together in assembled relation with said diaphragm by a plurality of bolts 122. The valve section 119 is recessed to provide a chamber 123 above the diaphragm 121, and which chamber is subjected, through the passage 114 and the conduit 115, to the pressure existing at the throat 111 in the Venturi member 106. The valve section 120 is recessed to provide a chamber 124 on the opposite side of the diaphragm 121, and which chamber is subjected, through the conduit 92, to the steam pressure existing in the steam separator 79. Thus, the diaphragm 121 is subjected to the differential pressure between the pressure in the re-feed pipe 103 at the Venturi throat 111 and the pressure in the steam separator 79.

A third valve section 125 is secured to the valve section 119 by a plurality of machine screws 126 and a flexible diaphragm 127 is interposed between the valve sections 119 and 125. A ring member 128 is secured to the valve section 120 by a plurality of machine screws 129 and a flexible diaphragm 130 is interposed between the ring 128 and the valve section 120. A supporting disc 131 for the diaphragm 121 is disposed in the chamber 123 and a spacer 132 is interposed between the disc 131 and the diaphragm 127, the spacer 132 being received in an opening 133 in the valve section 119. A similar diaphragm supporting disc 134 is disposed in the chamber 124 to support the opposite side of the diaphragm 121 and a spacer 135 is disposed between the disc 134 and the diaphragm 130 and is received in an opening 136 in the valve section 120. A washer 137 is engaged with the outer side of the diaphragm 130 and a nut member 138 is disposed in the valve section 125 and engaged with the upper side of the diaphragm 127. A bolt 139 extends through the washer 137, diaphragm 130, spacer 135, disc 134, diaphragm 121, disc 131, spacer 132, diaphragm 127 and into the nut member 138 for securing these parts together in assembled relation. Thus, the pressure chamber 123 at the upper side of the diaphragm 121 is closed by the diaphragm 127 and the pressure chamber 124 at the lower side of the diaphragm 121 is closed by the diaphragm 130.

The valve section 125 has a vertical passageway 140 formed therein in which a valve seat 141 is mounted. A valve stem 142 has a lower threaded end 143 which is adjustably mounted in the upper portion of the nut member 138. The valve stem 142 includes a cylindrical portion 144 which is slidably guided in a portion of the passageway 140 and has a tapered head portion 145 at its upper end which is adapted to engage with the seat 141. The valve section 125 has a threaded outlet opening 146 which communicates with the passageway 140 at a location above the seat 141 and one end of a by-pass conduit 148 is threaded into the opening 146 and the opposite end of said conduit is connected with one end of the intake manifold 15 of the feed water pump F. A manually-operable shutoff valve 149 (Fig. 1) is connected in the conduit 148. A threaded inlet opening 150 (Fig. 4) is formed in the valve section 125 at a location below the valve seat 141 and a conventional fitting 151 is mounted in said opening. One end of a by-pass conduit 152 is secured to the fitting 151 and the opposite end of said conduit is connected by a fitting 153 for communication with the chamber 54 of the pump head 17 of the feed water pump F, the conduit 152 being indicated in dot-and-dash lines in Fig. 7 and shown in full lines in Fig. 8. The stem portion 145 cooperates with the seat 141 to control the flow of feed water from the chamber 54 through the conduits 152 and 148 back to the intake manifold 15 and intake passage 51, to effect by-passing of feed water around the pump head 17 by circulating or recycling the same when not required for replenishing purposes in the system, as will be pointed out more fully hereinafter. The upper end of the passageway 140 is threaded for the reception of a plug 154, which is removable to permit adjustment of the stem 142 to vary the pressure differential required to raise the head 145 from engagement with its seat 141 to effect opening of the by-pass valve 117.

The operation of the system disclosed in Fig. 1 is as follows:

The motor 2 which drives the multiple pump means 1 runs continuously when the steam generating unit 8 is in operation. It will be understood, of course, that fuel is supplied to the burner 9 for heating the liquid pumped through the heating coil 13 whenever operation of the burner is required. The capacity of the feed pump heads 17 and 17a exceeds the maximum steam generating capacity of the unit 8 so that an excess of water is supplied to the heating coil 13 at all times in order to avoid all possibility of said heating coil being burned out. Feed water is supplied to the feed pump F from the feed water tank 18 through the pipeline 20 from whence it enters the intake manifold 15 and the passage 51 in the housing 17 from whence it will flow on the pump suction stroke, past the spring-pressed inlet check valve 18 into the chamber 54. The pump pulsation will force this water past the outlet check valve 19 into the outlet feed manifold 16, through the pipe 27 and thence into the mixing chamber 29. The water will then be conducted by the pipe 27 to the inlet end 28 of the heating coil 13. Heated liquid from the coil 13 will be ultimately discharged through the pipe 78 into the steam separator 79, and the amount of excess water in the system will be indicated by the rise of level of the water in the steam separator 79, as indicated by the gauge glass 80. Any water accumulated in the steam separator 79 will be conducted through the pipeline 96 to the intake 69 of the head 68 of the recirculating pump R and will be pumped into the outlet 69a from whence it will be conducted by the pipe 70 to the mixing chamber 29, as will be readily understood, so that both feed and recirculating water will now be supplied to the heating coil 13 through the pipe 27.

Meanwhile, in the normal use of the apparatus, water will continue to be supplied by the feed pump F and the excess will be withdrawn from the steam separator 79 and recirculated by the recirculating pump R and a portion of the heated water will flash into steam when discharged into the steam separator 79. The gauge 93 will indicate the steam pressure in the separator 79. Should the liquid level in the separator 79 rise to the level 104, the excess liquid will begin to discharge from the separator 79 through the re-feed pipe 103 and pass through the Venturi member 106 on its way to the intake 101 of the head 100 of the re-feed pump R'. When no liquid is being discharged from the separator 79 into the re-feed conduit 103, the pressure in the chambers 123 and 124 of the by-pass valve 117 are substantially equal and the valve remains closed. However, when re-feed liquid is being discharged into the re-feed conduit 103, it will flow through the Venturi member 106 and its velocity will rapidly increase during its flow through the nozzle portion 109 to the throat 111 and then decrease during its flow from the throat 111 through the nozzle portion 110. The pressure is least at the throat portion 111 and has the effect of reducing the pressure in the conduit 115 and chamber 123 so that the pressure in the conduit 92 and chamber 124 is the greater, and the valve head 145 will be raised from its seat 141 to permit by-passing of feed water around the pump head 17, it being apparent that when the by-pass valve 117 is open, feed water will flow continuously from the chamber 54 in the pump head 17, through the conduit 152, then through the valve seat 141, then through the conduit 148 back to the intake manifold 15, through the passage 51 and inlet check valve 18 and back to the chamber 54 without entering the heating coil 13. The feed pump head 17a will continue in operation without by-passing feed water, but the ultimate result is that the volume of feed water going to the heating coil 13 is reduced in amount by a volume equal to that re-fed by the re-feed pump R', inasmuch as the capacities of the pump heads 17 and 100 are equal. Stated another way, the feed pump head 17 idles whenever the re-feed pump head 100 is working. On the other hand, the feed pump head 17a and the recirculating pump head 68 are both always working under normal conditions of operation.

The availability of water for re-feed purposes indicates that the load or steam demand 88 is less than the capacity of the unit. However, if the steam demand increases to the extent that the liquid level in the steam separator 79 drops below the level 104, re-feed liquid will cease to be available and the pressure will increase in chamber 123, Fig. 4, and the by-pass valve 117 will automatically close, thereby permitting the feed pump head 17 to discharge feed water from the chamber 54 through the outlet check valve 19 into the discharge manifold 16 for delivery to the heating coil 13. Thus, the feed water supply is controlled in accordance with load requirements and a substantially uniform volume of liquid is maintained in the system.

Should the water level in the steam separator 79 rise above the level 104 to the level $x$ opposite the pipe 81, the water will be trapped out of the steam separator 79 through the steam trap 83 and be returned through the pipe 84 and nipple 85 to the feed water storage tank 29, whereby to avoid excessive and undesirable water level in the steam separator 79. The leading-off of the water at the level 104 affords the advantage of requiring less liquid to be trapped out of the steam separator 79 through the steam trap 83 for return to the feed water tank 23, thus avoiding the heat loss that would otherwise occur incident to the discharge of water at vapor forming temperature into the feed water tank. This arrangement also eliminates the possibility of the presence of water at boiling temperatures in the feed water tank 23, which might cause vapor locking of the feed pump F, and at the same time eliminates the presence of water vapor arising or escaping from the feed water tank 23, which is objectionable in many installations.

It will be understood that the pressure differential operated by-pass valve 117 operates automatically in accordance with the pressure differential across the system between the throat 111 of the Venturi member 106 and the steam pressure in the steam separator 79.

The condensate resulting from condensing of the steam by the load 88 is returned to the feed water tank 23 through the pipe 89. Should the water level in the feed water tank 23 drop below a predetermined level, the float mechanism 24 will operate to effect opening of the valve 25 to admit fresh water into the tank 23 through the supply pipe 26.

The steam generating system diagrammatically shown in Fig. 2 includes many of the elements described in connection with the system shown in Fig. 1 and the corresponding parts have been identified by the same reference numerals.

Figure 2:
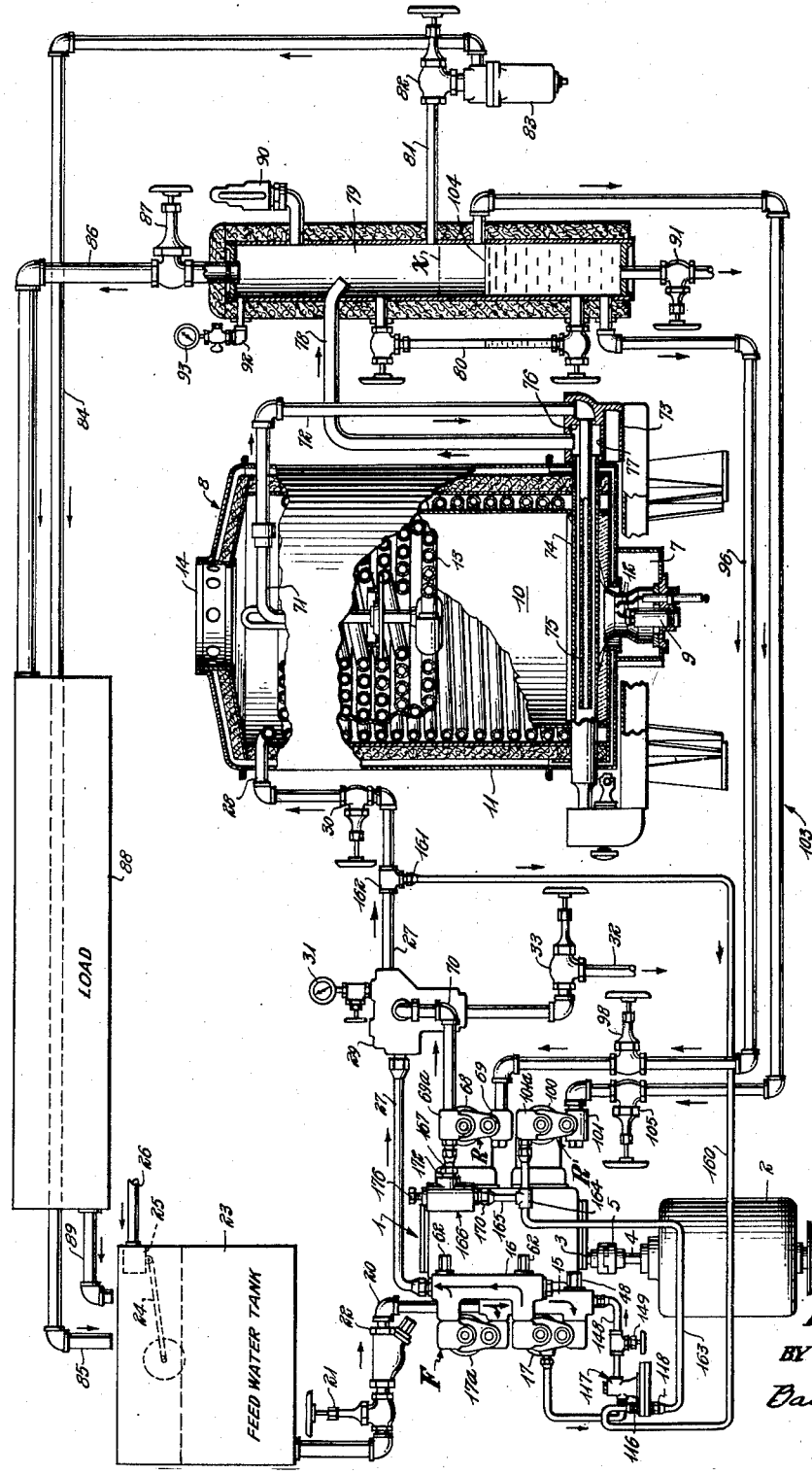

The principal differences between the system shown in Fig. 2 and that shown in Fig. 1 consists in the omission of the Venturi member 106 from the re-feed conduit 103, and the connection of the pressure chamber 123 of the pressure differential operated by-pass valve 117 with the pipeline 27 connected with the inlet end 28 of the heating coil 13, and the interposition of a back pressure-responsive valve 166 in a tube between the discharge outlets 69a and 101a of the recirculating pump R and the re-feed pump R', respectively, and the connection of such tube with the pressure chamber 124 of the valve 117. Thus, a conduit 160 has one end thereof connected with the fitting 116 and its other end connected by a fitting 161 with the stem of a pipe-T 162 interposed in the pipeline 27 between the mixing chamber 29 and the manually operable valve 30. The fitting 118 has one end of a conduit 163 connected thereto and the opposite end of the conduit is connected with the discharge end 101a of the re-feed pump unit R', a pipe-T 164 being connected in the conduit 163 adjacent said discharge end. The stem of the pipe-T 164 is connected by a conduit 165 to the inlet side of a back pressure responsive valve 166. The outlet side of the valve 166 is connected by a conduit 167 with the discharge end 69a of the recirculating pump unit R. Thus, the pressure chamber 123 of the by-pass valve 117 is subject to the pressure differential between the back pressure in the pipe 27 supplying water to the inlet of the coil 13 and the pressure chamber 124 of said by-pass valve is subject to the pressure at the discharge end 101a of the re-feed pump unit R'. The back pressure responsive valve 166 is illustrated in detail in Fig. 6, to which reference will now be made.

The back pressure valve 166 comprises a body 168 having a threaded inlet opening 169 to which one end of the conduit 165 is connected by a conventional fitting 170. The valve body 168 also has a threaded discharge opening 171 and a fitting 172 mounted therein for connecting one end of the conduit 167 to said valve. A valve seat 173 is mounted in the valve body 168 in alignment with the inlet opening 169 and a valve disc 174 is adapted to engage said seat to cut off flow therethrough. The upper end of the valve body 168 is threaded for the reception of a plug 175 and a screw 176 is adjustably mounted in the plug 175. The adjusting screw 176 has a lower end 177 of reduced diameter adapted to extend through a washer 178. A compression spring 179 surrounds the screw end 177 and engages the washer 178, and the opposite end of the spring engages the valve disc 174 in surrounding relation to a projection 180 carried by said valve disc. The spring 179 exerts a force tending to maintain the valve disc 174 seated. The pressure exerted by the spring 179 can be varied by adjusting the screw 176 so that the valve disc 174 will unseat at a desired predetermined pressure. A lock nut 181 is mounted on the screw 176 and is adapted to be jammed against the plug 175 to lock the screw 176 in any desired position of adjustment.

It will be apparent from Figs. 2 and 6 that the valve disc 174 will remain seated so long as the pressure in the inlet opening 169 of the valve 166 is less than the resistance to unseating of the valve disc 174 offered by the pressure of the spring 179 and the back pressure in the discharge opening 171 of the valve 166. Thus, if the pressure in the outlet opening 171 communicating with the inlet of the heating coil 13 is 100 lbs. per square inch, a pressure of 110 lbs. per square inch in the inlet opening 169 will be required to raise the disc 174 off its seat to open the valve 166. The pressure in the inlet opening 169 is, of course, communicated through the conduit 163 to the pressure chamber 124 tending to effect opening of the feed water by-pass valve 117. The pressure in the chamber 124, of course, is opposed by the pressure in the chamber 123 tending to maintain the by-pass valve 117 closed, the pressure in the chamber 123 being communicated thereto through the conduit 160 and corresponding substantially to that existing in the feed water pipe 27 attached to the heating coil inlet. So long as there is no re-feed liquid available for return to the heating coil by the re-feed pump R' the pressure in the feed water pipe 27 will predominate and both the back pressure valve 166 and the by-pass valve 117 will remain closed. However, when excess liquid above the level 104 in the steam separator 79 is conducted to the re-feed pump R' through the conduit 103, sufficient pressure will be built up in the valve inlet 169 to cause the valve 166 to open, and re-feed water delivered to the conduit 165 by the re-feed pump unit R', will flow through the valve 166 into the discharge outlet 69a of the recirculating pump R and join the water being recirculated by the recirculating pump R. The mixed discharge from the two pumps R and R' flows into the mixing chamber 29 and thence into the feed water pipe 27 for admission into the heating coil 13. The opening of the back pressure valve 166 will result in a reduction in the pressure in the chamber 124 of the by-pass valve 117 so that the pressure in the chamber 123 will predominate to effect opening of the by-pass valve 117 to by-pass feed water around the one feed pump head 17, as previously explained in connection with the system shown in Fig. 1.

The operation of the system illustrated in Fig. 2 is otherwise the same as that discussed in connection with the system shown in Fig. 1, except for the differences in the feed water control effected by the connection of the pressure differential operated by-pass valve 117 with different points in the system, so that it is responsive to the re-feed pump pressure whenever it exceeds the heating coil inlet pressure, to effect by-passing of feed water.

Figure 3:
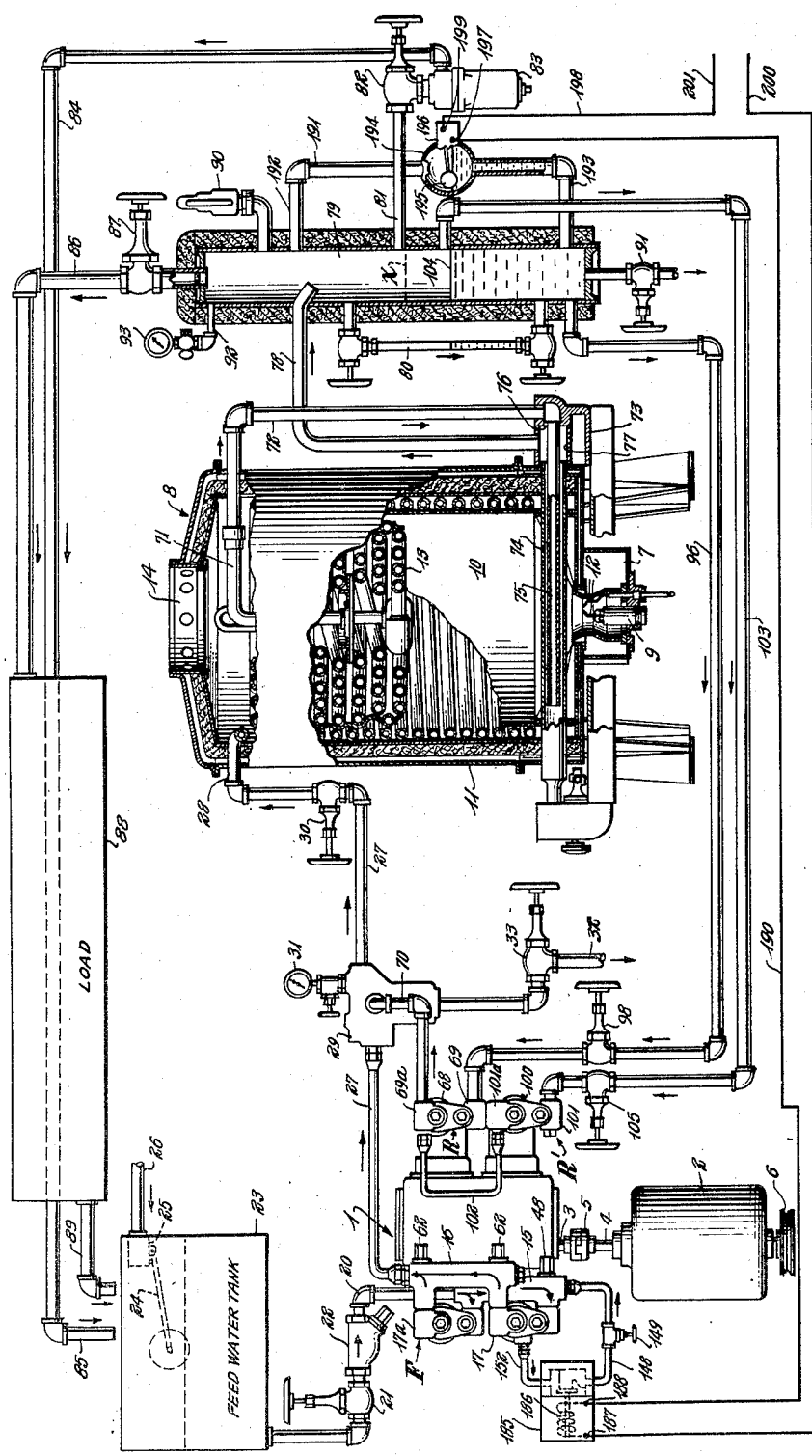

The steam generating system illustrated in Fig. 3 is also similar to that shown in Fig. 1, except that the Venturi member 66 has been omitted and a solenoid operated by-pass valve has been substituted for the pressure differential operated by-pass valve 117, the solenoid valve being arranged so that it is operated in accordance with variations in the water level in the steam separator, in lieu of being operated in accordance with a pressure differential across two selected points in the system. Here again, for convenience, corresponding parts of the two systems have been identified by the same reference numerals. Thus, a solenoid operated by-pass control valve 185 is diagrammatically shown connected in the by-pass conduit 148—152. The valve 185 includes a conventional coil 186, terminals 187 and 188 to which conductors 189 and 190, respectively, are connected.

A pipeline 191 includes a portion 192 which is connected to the steam separator 79 at a point well above the pipe 81 and has another portion 193 which is connected with the steam separator 79 at a point adjacent the bottom thereof. A float chamber 194 is disposed in the pipeline 191 in a horizontal plane common to that of the maximum desired liquid level 104. A conventional float 195 is disposed in the float chamber 194 and arranged to actuate a conventional float switch 196. The conductor 190 is connected to one terminal 197 of the switch 196 and another conductor 198 is connected to the other terminal 199 of said switch. The conductors 189 and 198 are connected with leads 200 and 201, respectively, which in turn are connected with a suitable source of supply of electrical current (not shown).

The arrangement of the float 195 and switch 196 is such that the solenoid valve 185 remains closed so long as the level of the liquid in the steam separator 79 does not rise substantially above the level 104. This means, of course, that the feed pump F will operate at full capacity through both heads 17 and 17a to supply water to the heating coil 13. However, when the height of the liquid level in the steam separator 79 increases, the float 195 will rise in the float chamber 194 and effect closing of the switch 196, thereby energizing the solenoid valve 185 to effect opening thereof and causing the feed pump F to by-pass water around the pump head 17 through the conduit 152, valve 185, conduit 148 and intake manifold 15 to thus decrease the amount of feed water supplied to the coil 13. The recirculating pump R and the re-feed pump R' are operated continuously to circulate water through the system by returning water accumulated in the separator 79 to the heating coil 13 and by re-feeding any excess water that accumulates in the steam separator 79 above the level 104. When the re-feed pump has succeeded in lowering the liquid level sufficiently for the float 195 to be lowered and open the switch 196, the solenoid valve 185 will close and the by-passing of feed water will cease. Should a greatly excessive amount of water accumulate in the steam separator 79 so as to reach the level x and require trapping-out through the pipe 81 and the steam trap 83, such undesirable excess will be returned to the feed water tank 23 through the pipeline 84, as previously explained in connection with the system shown in Fig. 1. Thus, the system shown in Fig. 3 provides for efficient and economical operation of the steam generating system with a minimum of heat loss by automatically controlling the amount of feed water added to the system and by keeping to a minimum the amount of water that is trapped out of the steam separator 79 and returned to the feed water tank 23.

While three automatic feed water control systems have been disclosed herein for carrying out the principles of the invention, it will be understood that variations may be made in the details of construction and in the arrangement of the parts comprising the same without departing from the principles of the invention or the scope of the annexed claims.

I claim:

1. A steam generating apparatus, comprising: a liquid heater having an inlet and an outlet; a feed pump for supplying liquid to the inlet of said liquid heater; a steam separator connected with the outlet of said liquid heater; a re-feed pump having an outlet communicating with the inlet of said liquid heater and an inlet connected with said steam separator at a predetermined level in said steam separator to remove excess liquid therefrom above said level; and means for effecting by-passing of make-up liquid from an outlet of said feed pump back to an inlet of said feed pump by continuous cycling without passing through said liquid heater and in a volume substantially equal to the volume of liquid re-fed to the liquid heater from said steam separator by said re-feed pump.

2. Steam generating apparatus, comprising: a liquid heater having an inlet and an outlet; a feed pump for supplying liquid to the inlet of said liquid heater; a steam separator connected with the outlet of said liquid heater; a circulating pump arranged to continuously pump liquid from the lower end of said steam separator to the inlet of said liquid heater; a re-feed pump having an outlet communicating with the inlet of said liquid heater and an inlet connected with said steam separator at a predetermined level in said steam separator to remove excess liquid therefrom above said level; and means for effecting by-passing of intended make-up liquid from an outlet of said feed pump back to an inlet of said feed pump by continuous cycling without passing through said liquid heater and in a volume substantially equal to the volume of liquid re-fed to the liquid heater from said steam separator by said re-feed pump.

3. Steam generating apparatus, comprising: a liquid heater having an inlet and an outlet; a feed pump for supplying liquid to the inlet of said liquid heater; a steam separator connected with the outlet of said liquid heater; a circulating pump having an inlet connected with said steam separator at a point adjacent the lower end thereof and having an outlet connected with said liquid heater for continuously withdrawing liquid from said steam separator for recirculation through said liquid heater; a by-pass conduit connected with said feed pump for by-passing feed liquid from an outlet back to an inlet of said feed pump without entering said liquid heater; a re-feed pump arranged to return excess liquid above a given liquid level in said steam separator to said liquid heater; a by-pass control valve connected in said by-pass conduit; and means for automatically effecting opening of said by-pass control valve to by-pass feed liquid while liquid is being returned to said liquid heater by said re-feed pump.

4. Steam generating apparatus, comprising: a liquid heater having an inlet and an outlet; a feed water tank; a feed water pump having an inlet communicating with said feed water tank and an outlet communicating with said liquid heater for supplying water to said liquid heater; a steam separator connected with the outlet of said liquid heater; a re-feed pump communicating with said steam separator and with the inlet of said liquid heater arranged to return excess liquid above a given level in said steam separator to the inlet of said liquid heater; and means for reducing the volume of feed water delivered by said feed water pump to said liquid heater in an amount substantially equal to the volume of liquid pumped by said re-feed pump.

5. Steam generating apparatus, comprising: a liquid heater having an inlet and an outlet; a feed water tank; a feed water pump having an inlet communicating with said feed water tank and an outlet communicating with said liquid heater for supplying water to said liquid heater; a steam separator connected with the outlet of said liquid heater; a re-feed pump communicating with said steam separator and with the inlet of said liquid heater arranged to return liquid above a given level in said steam separator to the inlet of said liquid heater; means for reducing the volume of feed water delivered by said feed water pump to said liquid heater in an amount substantially equal to the volume of liquid pumped by said re-feed pump; a steam trap communicating with said steam separator at a point corresponding to a maximum liquid level disposed a substantial distance above said given level for trapping excess liquid out of said steam separator; and conduit means connected with said steam trap for returning the trapped-out liquid to said feed water tank.

6. A steam generating system, comprising: a liquid heater having an inlet and an outlet; a feed pump for supplying liquid to the inlet of said liquid heater; a steam separator connected with the outlet of said liquid heater; a re-feed pump arranged to return excess liquid above a given liquid level in said steam separator to the inlet of said liquid heater; a by-pass conduit connecting an outlet of said feed pump with an inlet of said feed pump and having a pressure-responsive by-pass valve therein arranged to bypass liquid that would otherwise flow to said heater by recycling said liquid through said feed pump and said by-pass conduit, said by-pass valve being operable in response to the differential of pressure across two selected points of the system including a point subject to the discharge pressure of said re-feed pump and being arranged to open to permit by-passing of make-up liquid whenever the re-feed pump discharge pressure is the greater.

7. Steam generating apparatus, comprising: a liquid heater having an inlet and an outlet; a feed pump for supplying liquid to the inlet of said liquid heater; a steam separator connected with the outlet of said liquid heater; a by-pass conduit connecting an outlet of said feed pump directly with an inlet of said feed pump for by-passing liquid that would otherwise flow to said heater by recycling said liquid through said feed pump and said bypass conduit feed liquid by cycling the same at said feed pump; a re-feed pump and conduit independent of said by-pass conduit arranged to return excess liquid above a predetermined liquid level in said steam separator to said liquid heater; a pressure differential responsive by-pass control valve connected in said by-pass conduit; and means subjecting said valve to the differential of pressure between the steam pressure in said steam separator and the pressure of the refeed liquid en route to said refeed pump for effecting opening of said pressure responsive by-pass control valve to by-pass feed liquid whenever the steam pressure is the greater.

8. A steam generating system, comprising: a liquid heating element having an inlet and an outlet; a feed pump for supplying liquid to the inlet of said liquid heating element; a steam separator connected with the outlet of said liquid heating element; a circulating pump arranged to pump liquid from the lower end of said steam separator to said liquid heating element; a re-feed pump arranged to return excess liquid above a given desired normal liquid level in said steam separator to the inlet of said liquid heating element; a by-pass conduit connected with said feed pump and having a pressure-responsive by-pass valve arranged therein to bypass liquid from an outlet of said feed pump back to an inlet of said feed pump by continuous cycling without passing through said liquid heating element said by-pass valve being operable in response to the differential pressure between the heating element inlet pressure and the discharge pressure of said re-feed pump and being arranged to open to permit by-passing of make-up water whenever the re-feed pump discharge pressure exceeds the heating element inlet pressure.

9. A steam generating system, comprising: a liquid heater having an inlet and an outlet; a feed pump for supplying liquid to the inlet of said liquid heater; a steam separator connected with the outlet of said liquid heater; a re-feed pump and re-feed conduit means arranged to return excess liquid above a given desired normal liquid level in said steam separator to said liquid heater; a Venturi member connected in said re-feed conduit means at a point between said steam separator and said re-feed pump; a by-pass conduit connected with said feed pump and having a pressure-responsive by-pass valve therein arranged to by-pass liquid from an outlet of said feed pump back to an inlet of said feed pump without passing through said liquid heater, said by-pass valve being operable in response to the differential of pressure between two selected points of the system including the pressure at the throat of said Venturi member as one of said points and being arranged to open to permit by-passing of feed liquid when the Venturi throat pressure is the lesser.

10. Steam generating apparatus, comprising: a liquid heater adapted to receive a liquid to be heated, said liquid heater having an inlet and an outlet; a feed pump for pumping liquid into the inlet of said liquid heater; a steam separator connected with the outlet of said liquid heater; a circulating pump having an inlet and an outlet; means connecting the outlet of said circulating pump with the inlet of said liquid heater and means connecting the inlet of said circulating pump with said steam separator at a point adjacent the lower end thereof, whereby liquid from the steam separator is recirculated through said liquid heater; a re-feed pump having an inlet and an outlet; means connecting the outlet of said re-feed pump with the inlet of said liquid heater; a conduit having one end thereof connected with said steam separator at a predetermined level in said steam separator and the other end thereof connected with the inlet of said re-feed pump for conducting excess liquid above said level from said steam separator to said re-feed pump; and automatic means including a by-pass conduit connected with said feed pump for effecting by-passing of at least a portion of the liquid pumped by said feed pump by continuous cycling without passing through said liquid heater at times when said re-feed pump is returning liquid from said steam separator to said liquid heater.

11. Steam generating apparatus, comprising: a heating coil adapted to receive a liquid to be heated, said heating coil having an inlet end and an outlet end; a feed pump arranged to pump liquid into the inlet end of said heating coil; a steam separator connected with the outlet end of said heating coil; a circulating pump having an inlet and an outlet; means connecting the outlet of said circulating pump with the inlet end of said heating coil, and means connecting the inlet of said circulating pump with said steam separator at a point adjacent the lower end thereof; a re-feed pump having an inlet and an outlet; a conduit connecting the outlet of said re-feed pump with the outlet of said circulating pump; a conduit having one end thereof connected with said steam separator at a predetermined level in said steam separator and the other end thereof connected with the inlet of said re-feed pump for conducting excess liquid above said level from said steam separator to said re-feed pump; and automatic means for effecting by-passing of at least a portion of the liquid pumped by said feed pump by continuous cycling without passing through said liquid heater at times when said re-feed pump is returning liquid from said steam separator to said heating coil.

12. Steam generating apparatus, comprising: a heating coil adapted to receive a liquid to be heated, said heating coil having an inlet end and an outlet end; a feed pump arranged to pump liquid into the inlet end of said heating coil; a by-pass conduit connected with said feed pump for by-passing feed liquid around said feed pump; a pressure differential operated by-pass control valve connected in said by-pass conduit, said by-pass valve having opposed pressure chambers; a steam separator connected with the outlet end of said heating coil; a re-feed pump having an inlet and an outlet; a re-feed conduit having one end thereof connected with said steam separator at a predetermined level in said steam separator and the other end thereof connected with the inlet of said re-feed pump for conducting excess liquid above said level from said steam separator to said re-feed pump; a Venturi member connected in said re-feed conduit and having a throat portion intermediate its ends; means communicating the steam pressure of said steam separator to one of said pressure chambers of said by-pass valve; and means communicating the Venturi throat pressure to the other of said pressure chambers of said by-pass valve, said by-pass valve being arranged to open to by-pass liquid from an outlet of said feed pump back to an inlet of said feed pump by continuous cycling without passing through said liquid heater whenever the pressure at said Venturi throat is less than the steam pressure in said steam separator.

13. Steam generating apparatus, comprising: a heating coil adapted to receive a liquid to be heated, said heating coil having an inlet end and an outlet end; a feed pump arranged to pump liquid into the inlet end of said heating coil; a by-pass conduit connected with said feed pump for by-passing feed liquid around said feed pump by continuously recycling the same without passing through said heating coil; a pressure differential operated by-pass control valve connected in said by-pass conduit, said by-pass valve having opposed pressure chambers; a steam separator connected with the outlet end of said heating coil; a circulating pump having an inlet and an outlet; means connecting the outlet of said circulating pump with the inlet end of said heating coil, and means connecting the inlet of said circulating pump with said steam separator at a point adjacent the lower end thereof; a re-feed pump having an inlet and an outlet; a conduit having one end thereof connected with said steam separator at a predetermined level in said steam separator and the other end thereof connected with the inlet of said re-feed pump for conducting excess liquid above said level from said steam separator to said re-feed pump; a tube connecting the outlet of said re-feed pump with the outlet of said circulating pump; a spring-loaded, pressure responsive valve connected in said tube arranged to automatically open when the outlet pressure of said re-feed pump exceeds the inlet pressure of said heating coil by a predetermined amount; means communicating the outlet pressure of said re-feed pump to one of the pressure chambers of said by-pass control valve; and means communicating the heating coil inlet pressure to the other of said pressure chambers, said by-pass valve being arranged to open to by-pass liquid from said feed pump when the pressure at the outlet of said re-feed pump exceeds the inlet pressure of said heating coil.

References Cited in the file of this patent

UNITED STATES PATENTS

| | | |
|---|---|---|
| 1,828,814 | Lucke | Oct. 27, 1931 |
| 1,860,363 | LaMont | May 31, 1932 |
| 1,939,415 | Schaub | Dec. 12, 1933 |
| 2,098,912 | Dillman | Nov. 9, 1937 |
| 2,199,214 | Vorkauf | Apr. 30, 1940 |
| 2,201,622 | LaMont | May 21, 1940 |
| 2,207,809 | Lauffer et al. | July 16, 1940 |
| 2,227,349 | Kerrick | Dec. 31, 1940 |
| 2,254,441 | Muller et al. | Sept. 2, 1941 |
| 2,313,269 | Sadtler | Mar. 9, 1943 |
| 2,322,102 | Gschwind | June 15, 1943 |
| 2,405,573 | Frisch | Aug. 13, 1946 |
| 2,574,368 | Arant | Nov. 6, 1951 |
| 2,619,037 | O'Connor et al. | Nov. 25, 1952 |